UNITED STATES PATENT OFFICE.

RUDOLF KNIETSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

PROCESS OF MAKING SULFURIC ACID.

No. 800,218.          Specification of Letters Patent.          Patented Sept. 26, 1905.

Application filed July 16, 1901. Serial No. 68,499.

*To all whom it may concern:*

Be it known that I, RUDOLF KNIETSCH, doctor of philosophy and chemist, a subject of the King of Prussia, German Emperor, residing at Ludwigshafen-on-the-Rhine, in the Kingdom of Bavaria, German Empire, have invented new and useful Improvements in the Manufacture of Sulfuric Acid, of which the following is a specification.

In the specification of Letters Patent No. 652,119 is described a catalytic process for the production of sulfuric acid, in which process the gases from the pyrites-burners are before their combination to sulfuric anhydrid thoroughly purified from all injurious impurities, and finally an acid is obtained which is entirely free from arsenic, nitrous compounds, and lead. The commercial acid obtained by this process contains as sole impurity a small quantity of iron. The iron is introduced owing to the practical necessity of effecting the absorption of the sulfuric anhydrid first formed in iron apparatus. The present invention provides an improvement in this manufacture whereby commercial sulfuric acid can be obtained directly, which acid is for technical purposes practically free from iron—that is to say, can be obtained with only .003 per cent. of iron, or even less. I effect this result by absorbing the sulfuric anhydrid in a fuming sulfuric acid containing about twenty-seven per cent. of free sulfuric anhydrid or more—that is, in an acid of minimum strength corresponding to the composition approximately represented by the formula $2H_2SO_4 + SO_3$. The absorption may be effected in a wrought-iron apparatus that can be kept cool. I have discovered that acid of the concentration defined does not dissolve iron, especially wrought-iron, even on warming and when subjected to considerable agitation with the acid. The more concentrated the fuming acid is above this minimum the less liable is the iron to be attacked, so that, speaking generally, the stronger the fuming acid used for absorption the greater the safety in working. The fuming acid used for absorbing constantly becomes more concentrated, and it is necessary in order that it may continue to absorb the sulfuric anhydrid that it be diluted. Care must be taken that the diluent used—that is, water, steam, or sulfuric acid—is free from iron. It is further necessary that the gases containing sulfuric anhydrid that enter the absorber are free from iron compounds—for instance, ferric sulfate—which may be carried along mechanically. It may easily happen that such iron compounds are present owing to condensations of sulfuric acid in the iron pipe, resulting in the metal being attacked. In order to remove any such iron compounds carried along with the gases, the gases may be filtered before passing into the absorber, or the gases can be passed into a wider tube or chamber in order that the current may become slower and the particles carried along by the gases can settle, or the gases may be purified before they are absorbed by washing them by passing them through fuming sulfuric acid already saturated with sulfuric anhydrid at the temperature employed.

It is obvious that this invention can be carried out in a variety of ways. Thus in the absorption the gases containing the sulfuric anhydrid may be caused to bubble through the absorbing acid in iron apparatus constructed on the principle of the ordinary wash-bottle, or the sulfuric acid can be absorbed in a tower containing suitable material over which the absorbing acid trickles, or the gases containing the sulfuric anhydrid may be merely passed over the surface of the absorbing acid.

The process according to this invention can be effected with success and acid practically free from iron obtained if no weaker absorbing acid be used in the iron-absorbers than one containing at least twenty-seven per cent. of free $SO_3$ and if gases free from iron or its compounds are employed. It is preferable to use the absorbing acid containing from about thirty to forty per cent. of free $SO_3$—that is, at least eighty-seven to eighty-nine per cent. total $SO_3$.

The following example will serve to further illustrate the nature of my invention and the manner in which it may best be carried into practical effect; but the invention is not confined to this example.

Example: I produce gases containing sulfuric anhydrid by combining sulfur dioxid and oxygen, preferably as described in said Patent No. 652,119. I fill an apparatus of wrought-iron (constructed upon the principle of the ordinary wash-bottle) with fuming sulfuric acid, (containing from thirty to forty per cent. of free anhydrid.) I cause said gases containing the sulfuric anhydrid to pass either by pressure or by suction through the liquid. At the same time I continuously introduce through another pipe (which is preferably not made of iron) sufficient steam, water, or dilute sulfuric acid (containing, say, about sixty-five to seventy-five per cent. of $H_2SO_4$) so that the absorbing acid constantly contains thirty to forty per cent. free $SO_3$. The diluent used must of course be free from iron. The amount of diluent to be employed is determined and controlled by the examination of the acid produced, which is allowed to run off through an inverted siphon. The strength of the acid run off should never be less than that of fuming sulfuric acid containing thirty per cent. free $SO_3$.

There is at present hardly any demand for fuming sulfuric acid of the strength mentioned free from iron. Acid free from iron is principally required for use in accumulators and the preparation of alumina compounds for use in the paper and aluminium industries. For this purpose more dilute acids are required, so that the fuming sulfuric acid obtained must be diluted. This dilution must not be effected in an iron vessel, because the more dilute acids would attack the iron. The vessels used should be of earthenware or lead or be enameled. The fuming sulfuric acid obtained directly according to the above example is, however, particularly well suited for transport in iron vessels, because it is not contaminated by the iron of the vessels, as are the more dilute acids. The dilution of the fuming acid to any weaker concentration can afterward be effected in the factory where the acid is to be used.

I do not claim herein the generic process nor the specific process which are the subject of the claims in my application, Serial No. 68,498, filed July 16, 1901, the purport of the present application being to secure a specific invention within the generic claims of that application.

Having thus described my invention, I claim as new and desire to secure by Letters Patent—

1. The improvement in the process of manufacturing sulfuric acid, which consists in causing sulfuric anhydrid to be absorbed by fuming sulfuric acid containing throughout the operation from thirty to forty per cent. free sulfuric anhydrid in an iron vessel.

2. The improvement in the process of manufacturing sulfuric acid which consists in mixing sulfuric anhydrid, fuming sulfuric acid containing not less than twenty-seven per cent. free sulfuric anhydrid, and a diluent, in an iron vessel.

In testimony whereof I have hereunto set my hand in the presence of two subscribing witnesses.

RUDOLF KNIETSCH.

Witnesses:
  JOHN L. HEINKE,
  JACOB ADRIAN.